3,374,231
HYDRAZONES OF 1-AMINO-4-(XANTHENYL AND THIOXANTHENYL)PIPERAZINES

John W. Cusic, Skokie, and Peter Yonan, Chicago, Ill., assignors to G. D. Searle & Co., Chicago, Ill., a corporation of Delaware
No Drawing. Continuation-in-part of application Ser. No. 293,137, July 5, 1963. This application June 14, 1965, Ser. No. 463,929
Claims priority, application Great Britain, June 17, 1964, 25,131
15 Claims. (Cl. 260—240)

ABSTRACT OF THE DISCLOSURE

Hydrazones derived from 1-amino-4-(xanthenyl and thioxanthenyl)piperazines and a wide variety of aldehydes and ketones are described herein. These hydrazones are useful as anti-ulcer agents which do not possess anti-acetylcholine activity. They are usually prepared by the reaction of an aminopiperazine with an aldehyde or ketone.

---

The present application is a continuation-in-part of application Ser. No. 293,137, filed July 5, 1963, and now abandoned.

The present invention relates to a group of compounds which are hydrazone derivatives of 1-amino-4-(xanthenyl and thioxanthenyl)piperazines. More particularly, it relates to compounds having the following general formula

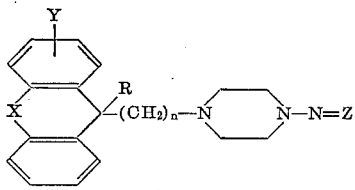

wherein $n$ is a whole number between 0 and 2 inclusive; R is selected from the group consisting of hydrogen and lower alkyl; X is an element of group VI of the periodic table of an atomic weight less than 40; Y is selected from the group consisting of hydrogen, methyl, and halogen; Z is selected from the group consisting of cycloalkylidene containing from 5 to 12 carbon atoms inclusively, substituted cycloalkylidene such as methylcyclohexylidene or phenylcyclohexylidene, cycloalkylidene with 1 or more aromatic rings fused thereto such as indanylidene, benzocyclohexylidene, fluoren-9-xylidene, dibenzocyclohexylidene, and dibenzocycloheptylidene; 1-substituted 4-piperidylidene such as 1-(lower alkyl)-4-piperidylidene, 1-benzyl-4-piperidylidene, and 1-diphenylmethyl-4-piperidylidene; 9-xanthenylidene, 9-thioxanthenylidene, and

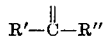

wherein R' is selected from the group consisting of hydrogen, lower alkyl, phenyl, tolyl, halophenyl, methoxyphenyl, dimethoxyphenyl, methylenedioxyphenyl, hydroxyphenyl, dialkylaminoalkoxyphenyl, dimethylaminophenyl, acetamidophenyl, cyanophenyl, styryl, phenyl(lower alkyl), naphthyl, diphenylyl, pyridyl, methylpyridyl, quinolyl, thienyl, furyl, and ferrocenyl, and R'' is selected from the group consisting of hydrogen, lower alkyl, and phenyl.

X can be either O or S so that the compounds under discussion are either substituted xanthenes or substituted thioxanthenes.

The halogen radicals referred to above include fluorine, chlorine, bromine, and iodine. The halophenyl radicals referred to above include fluorophenyl, chlorophenyl, bromophenyl, and iodophenyl. The lower alkyl radicals referred to above contain up to 6 carbon atoms and can be illustrated by radicals such as methyl, ethyl, butyl, and hexyl. Likewise, in the phenyl(lower alkyl) radicals referred to above, the lower alkyl portion contains up to 6 carbon atoms. Examples of such phenyl(lower alkyl) radicals are groups such as benzyl, phenethyl, and 3-phenylpropyl.

Likewise, there is a 6 carbon limitation with regard to the alkyl and alkoxy portions of the dialkylaminoalkoxyphenyl groups referred to above. Examples of such groups are then dimethylaminoethoxyphenyl, diethylaminoethoxyphenyl, diethylaminopropoxyphenyl, and dibutylaminopropoxyphenyl. In addition, cyclic amino groups can be present in place of the dialkylamino group in such substituents. Examples of such substituted groups are then piperidinoethoxyphenyl, piperidinopropoxyphenyl, and pyrrolidinopropoxyphenyl.

In addition to the specific substituted phenyl groups referred to above, it should be recognized that R' can represent polysubstituted radicals such as xylyl, trimethylphenyl, trifluorophenyl, dichlorophenyl, hydroxytolyl, fluorotolyl, methoxytolyl, hydroxymethoxyphenyl, and similar polysubstituted phenyl groups. Furthermore, radicals under R' such as phenyl(lower alkyl), styryl, naphthyl, and biphenylyl can be further substituted with groups such as methyl, methoxy, halogen, and similar groups. The possibility for such addition substitution holds true for any group referred to above which contains an aromatic ring. For example, the aromatic rings of fluoren-9-xylidene, dibenzocyclohexylidene, dibenzocycloheptylidene, 1-benzyl-4-piperidylidene, and 1-diphenylmethyl-4-piperidylidene can have substituents such as methyl, methoxy, or halogen.

The compounds of this invention are useful because of their pharmacological properties. In particular, they possess anti-ulcer activity which is demonstrated by their inhibition of ulceration when administered intragastrically to the Shay rat. The nature of the anti-ulcer activity is of particular interest. Thus, while the present compounds reduce the amount of free hydrochloric acid secreted by the stomach of the animal they have little or no effect on the actual amount of gastric juice secreted. In addition, they do not possess anti-acetylcholine activity and they are not ganglion blocking agents. Furthermore, the present compounds inhibit ulcers induced by corticoids such as prednisolone.

Besides the anti-ulcer activity described in detail above, the present compounds are also inhibitors of hepatic cholesterol synthesis.

The compounds of this invention are prepared by the condensation of the appropriate aldehyde or ketone with a 1-substituted 4-aminopiperazine in an inert solvent. A trace of acetic acid can be included to catalyze the reaction. Although 2-propanol is a particularly useful solvent for the reaction, ethanol or other alcohols can also be used. In addition, aromatic hydrocarbons such as benzene or toluene are useful as solvents in this type of reaction although, in this case, it is desirable to remove the water from the reaction mixture as it is formed. The reaction is promoted by the use of elevated temperatures.

Where the carbonyl compound used in the above reaction is a diaromatic ketone such as benzophenone, an alternate procedure may be desirable. Thus, fusion of the hydrazine and the ketone in the presence of acid gives the desired product.

Still another method of prepartion involves the reaction of a xanthen-9-ol or a thioxanthen-9-ol with a monosubstituted piperazine of the formula

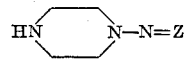

wherein Z is defined as above. The reaction is carried out in an inert solvent such as toluene in the presence of an organic carboxylic acid such as acetic acid or benzoic acid. The reaction mixture is usually heated for several hours to promote the reaction, and the water formed in the course of the reaction is generally distilled from the mixture.

The following examples are presented to further illustrate the present invention; they should not be construed as limiting it in spirit or in scope. In these examples, quantities are indicated in parts by weight and temperatures in degrees centigrade (° C.).

*Example 1*

To a solution of 1-amino-4-(9-xanthenyl)piperazine in 48 parts of 2-propanol is added a solution of 4 parts of freshly distilled benzaldehyde in 16 parts of 2-propanol and a drop of acetic acid. The resultant mixture is heated at the boiling point for about 5 minutes whereupon crystals begin to form in the mixture. The resultant mixture is cooled and the precipitated solid is separated by filtration and recrystallized from a mixture of benzene and hexane to give 1-benzylideneamino-4-(9-xanthenyl)piperazine melting at about 197–198° C. This compound has the following formula

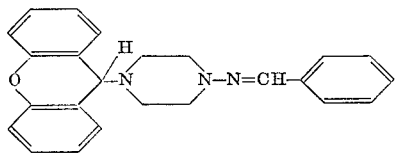

*Example 2*

An equivalent quantity of the appropriate hydrazine is substituted for the 1-amino-4-(9-xanthenyl)piperazine and the procedure of Example 1 is repeated. The particular hydrazine used and the product thus obtained are as follows:

1-amino - 4 - (9-thioxanthenyl)piperazine reacts with benzaldehyde to give 1-benzylideneamino-4-(thioxanthenyl)piperazine melting at about 163–164° C.

1-amino-4-(2-chloro-9-xanthenyl)piperazine reacts with benzaldehyde to give 1-benzylideneamino-4-(2-chloro-9-xanthenyl)piperazine melting at about 208–209° C. after recrystallization from a mixture of chloroform and ether.

1-amino-4-(4-methyl - 9 - xanthenyl)piperazine reacts with benzaldehyde to give 1-benzylideneamino-4-(4-methyl-9-xanthenyl)piperazine.

1-amino-4-(9-xanthenylmethyl)piperazine reacts with benzaldehyde to give 1-benzylideneamino-4-(9-xanthenylmethyl)piperazine melting at about 158–159° C. after recrystallization from a mixture of benzene and hexane.

1-amino-4-[2-(9-xanthenyl)ethyl]piperazine reacts with benzaldehyde to give 1-benzylideneamino-4-[2-(9-xanthenyl)ethyl]piperazine.

1-amino-4-(9-methyl - 9 - xanthenyl)piperazine reacts with benzaldehyde to give 1-benzylideneamino-4-(9-methyl-9-xanthenyl)piperazine.

1-amino-4-(9-ethyl-9-xanthenyl)piperazine reacts with benzaldehyde to give 1-benzylideneamino-4-(-ethyl-9-xanthenyl)piperazine.

*Example 3*

An equivalent quantity of the appropriate aromatic aldehyde or ketone is substituted for the benzaldehyde and the procedure of Example 1 is repeated in carrying out the following reactions:

4-tolualdehyde reacts with 1-amino-4-(9-xanthenyl)piperazine to give 1-(4-methylbenzylideneamino)-4-(9-xanthenyl)piperazine.

1-naphthaldehyde reacts with 1-amino-4-(9-xanthenyl)piperazine to give 1-(1-naphthylmethyleneamino)-4-(9-xanthenyl)piperazine.

*Example 4*

The procedure of Example 1 is repeated using an equivalent quantity of the appropriate halobenzaldehyde in place of the benzaldehyde. The following specific reactants and products are involved:

4-fluorobenzaldehyde reacts with 1-amino-4-(9-xanthenyl)piperazine to give 1-(4-fluorobenzylideneamino)-4-(9-xanthenyl)piperazine.

2-fluorobenzaldehyde reacts with 1-amino-4-(9-xanthenyl)piperazine to give 1-(2-fluorobenzylideneamino)-4-(9-xanthenyl)piperazine melting at about 162–163° C.

4-chlorobenzaldehyde reacts with 1-amino-4-(9-xanthenyl)piperazine to give 1-(4-chlorobenzylideneamino)-4-(9-xanthenyl)piperazine melting at about 211–212° C. after recrystallization from a mixture of benzene and hexane.

4-iodobenzaldehyde reacts with 1-amino-4-(9-xanthenyl)piperazine to give 1-4-iodobenzylideneamino)-4-(9-xanthenyl)piperazine.

*Example 5*

When an equivalent quantity of the appropriate hydroxybenzaldehyde or methoxybenzaldehyde is used in place of the benzaldehyde and the procedure of Example 1 is repeated, the corresponding hydrazones are obtained. Specifically, the following reactions and products are involved:

The reaction of 4-hydroxybenzaldehyde with 1-amino-4-(9-xanthenyl)piperazine gives 1-(4-hydroxybenzylideneamino)-4-(9-xanthenyl)piperazine melting at about 197–198° C. after recrystallization from a mixture of benzene and ethanol.

Reaction of salicylaldehyde with 1-amino-4-(9-xanthenyl)piperazine gives 1-(2-hydroxybenzylideneamino)-4-(9-xanthenyl)piperazine melting at about 193–194° C.

The reaction of 4-methoxybenzaldehyde with 1-amino-4-(9-xanthenyl)piperazine gives 1-(4-methoxybenzylideneamino)-4-(9-xanthenyl)piperazine.

Reaction of 3,4-dimethoxybenzaldehyde with 1-amino-4-(9-xanthenyl)piperazine gives 1-(3,4-dimethoxybenzylideneamino)-4-(9-xanthenyl)piperazine.

*Example 6*

4 parts of 1-amino-4-(9-xanthenyl)piperazine and 3.5 parts of 4-(2-diethylaminoethoxy)benzaldehyde are reacted in 65 parts of 2-propanol according to the procedure described in Example 1. The crude solid thus obtained is crystallized from ethanol to give 1-[4-(2-diethylaminoethoxy)benzylideneamino]-4-(9 - xanthenyl)piperazine melting at about 127–128° C.

1-amino-4-(9-xanthenyl)piperazine is reacted with 4-(2-dimethylaminoethoxy)benzaldehyde and 4-(3-diethylaminopropoxy)benzaldehyde according to the above procedure to give the corresponding hydrazone in each instance.

*Example 7*

The reaction of piperonal with 1-amino-4-(9-xanthenyl) piperazine according to the procedure described in Example 1 gives 1-piperonylideneamino-4-(9-xanthenyl) piperazine melting at about 191–193° C. after crystallization from a mixture of benzene and hexane.

Likewise, reaction of piperonal with 1-amino-4-(9-thioxanthenyl)piperazine gives 1-piperonylideneamino-4-(9-thioxanthenyl)piperazine melting at about 178–179° C. after recrystallization from a mixture of chloroform and hexane. This compound has the following formula

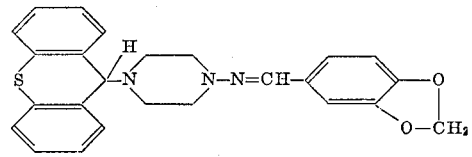

Example 8

If an equivalent quantity of the appropriate amino-substituted benzaldehyde is used in place of the benzaldehyde and the procedure of Example 1 is repeated, the corresponding hydrazones are obtained. Thus, reaction of 4-acetamidobenzaldehyde and 4-dimethylaminobenzaldehyde with 1-amino-4-(9-xanthenyl)piperazine gives, respectively, 1 - (4-acetamidobenzylideneamino)-4-(9-xanthenyl)piperazine melting at about 207–209° C. and 1-(4-dimethylaminobenzylideneamino) - 4 - (9-xanthenyl)piperazine melting at about 214–215° C. after recrystallization from a mixture of chloroform and hexane.

Example 9

The procedure of Example 1 is repeated using an equivalent quantity of 4-cyanobenzaldehyde in place of the benzaldehyde. The product obtained in this case is 1-(4-cyanobenzylideneamino) - 4-(9 - xanthenyl)piperazine melting at about 184–185° C. after crystallization from a mixture of benzene and hexane.

When 3-cyanobenzaldehyde is used in the same procedure, the product is 1-(3-cyanobenzylideneamino)-4-(9-xanthenyl)piperazine. This compound has the following formula

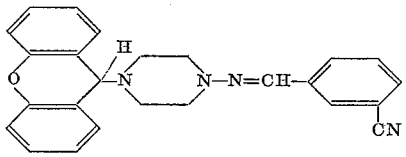

Example 10

The corresponding hydrazone is obtained when the procedure of Example 1 is repeated using an equivalent quantity of the appropriate aralkyl or aralkenyl aldehyde in place of the benzaldehyde. The following specific compounds are involved in reactions with 1-amino-4-(9-xanthenyl)piperazine:

Phenylacetaldehyde reacts with the aminopiperazine to give 1-(2-phenylethylideneamino)-4-(9-xanthenyl)piperazine.

Hydrocinnamaldehyde reacts with the aminopiperazine to give 1-(3-phenylpropylideneamino)-4-(9-xanthenyl)piperazine.

Cinnamaldehyde reacts with the aminopiperazine to give 1-cinnamylideneamino-4-(9 - xanthenyl)piperazine melting at about 212–213° C. after recrystallization from a mixture of chloroform and hexane.

Example 11

Reaction of formaldehyde, acetaldehyde, and hexaldehyde with 1-amino-4,(9-xanthenyl)piperazine according to the procedure described in Example 1 gives, respectively, 1-methyleneamino-4,(9-xanthenyl)piperazine, 1-ethylideneamino-4-(9-xanthenyl)piperazine, and 1-hexylideneamino-4-(9-xanthenyl)piperazine.

If 1-amino-4-(9-xanthenyl)piperazine is reacted with acetone and 3-pentanone according to the procedure of Example 7 the products are, respectively, 1-isopropylideneamino-4-(9-xanthenyl)piperazine melting at about 158–159° C., and 1-(1-ethylpropylideneamino)-4-(9-xanthenyl)piperazine.

Example 12

Cyclopentanone, cyclohexanone, and cyclododecanone are each reacted with 1-amino-4-(9-xanthenyl)piperazine according to the procedure described in Example 1 to give the corresponding hydrazones. The specific products are, respectively, 1-cyclopentylideneamino - 4 - (9-xanthenyl)piperazine, 1 - cyclohexylideneamino - 4 - (9 - xanthenyl)piperazine, and 1-cyclododecanylideneamino-4-(9-xanthenyl)piperazine melting at about 159–160° C. after recrystallization from hexane.

Example 13

When an equivalent quantity of the appropriate piperidone is substituted for the benzaldehyde and the procedure of Example 1 is repeated, the corresponding piperidylidene compound is obtained. Thus, 1-amino-4-(9-xanthenyl)piperazine reacts with 1-methyl-4-piperidone to give 1-(1-methyl-4-piperidylideneamino)-4-(9-xanthenyl)piperazine melting at about 160°–161° C. after recrystallization from 2-propanol. In the same way, 1-ethyl-4-piperidone reacts with the aminopiperazine to give 1-(1 - ethyl-4-piperidylideneamino)-4-(9-xanthenyl)piperazine which has the following formula

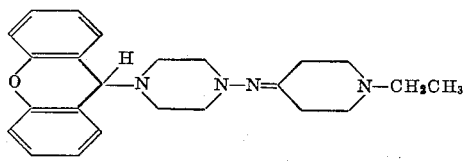

Example 14

A mixture of 2.5 parts of 1-amino-4-(9-xanthenyl)piperazine, 2.5 parts of 1-diphenylmethyl-4-piperidone, and 1 drop of acetic acid in 25 parts of 2-propanol is heated for about 5 minutes and then cooled. The solid which precipitates is separated by filtration and recrystallized from a mixture of benzene and hexane to give 1-(1-diphenylmethyl - 4 - piperidylideneamino)-4-(9-xanthenyl)piperazine melting at about 225–228° C. with decomposition.

In a similar manner, 1-benzyl-4-piperidone reacts with 1-amino-4-(9-zanthenyl)piperazine to give 1-(1-benzyl-4-piperidylideneamino)-4-(9-xanthenyl)piperazine.

Example 15

When the appropriate phenyl-substituted cyclic ketone or benzo(cyclic ketone) is reacted with 1-amino-4-(9-xanthenyl)piperazine according to the procedure of Example 1, the corresponding hydrazones are obtained. Specifically, the following compounds are involved:

4-phenylcyclohexanone reacts to give 1-(4-phenylcyclohexylideneamino)-4-(9-xanthenyl)piperazine melting at about 161–162° C. after recrystallization from 2-propanol.

1-indanone reacts with the amino compound to give 1-(1-indanylideneamino) - 4 - (9 - xanthenyl)piperazine melting at about 210–211° C., with decomposition, after recrystallization from a mixture of chloroform and hexane.

α-Tetralone yields 1-[3,4-dihydro - 1(2H) - naphthylideneamino]-4-(9-xanthenyl)piperazine in the above reaction.

Example 16

16 parts of 1-amino-4-(9-xanthenyl)piperazine is dissolved in 120 parts of 2-propanol and then 11 parts of 9-fluorenone and 2 drops of glacial acetic acid are added. The mixture is heated on a steam bath for 2 hours and then allowed to cool for 16 hours. The crystals which form are separated and recrystallized from a mixture of chloroform and hexane to give 1-(fluoren-9-ylideneamino)-4-(9-xanthenyl)piperazine melting at about 188–189° C. This compound has the following formula

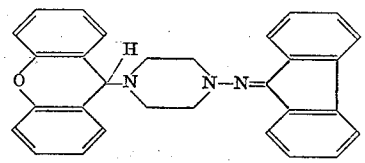

Example 17

A solution of 8.5 parts of 1-amino-4-(9-thioxanthenyl)piperazine, 5.5 parts of 9-fluorenone and 3 drops of acetic acid in 100 parts of 2-propanol is heated on a steam bath for 1 hour and then allowed to stand for 16 hours. The supernatant liquid is decanted and the residual oil is triturated with ether. The solid which forms is then separated and recrystallized from a mixture of benzene and hexane to give 1-(fluoren-9-ylideneamino)-4-(9-thioxanthenyl)piperazine melting at about 175–176° C.

1 - (fluoren-9-ylideneamino)-4-(2-chloro-9-xanthenyl)piperazine is obtained in the same manner by the reaction of 1-amino-4-(2-chloro-9-xanthenyl)piperazine with 9-fluorenone. This compound melts at about 185–187° C. after recrystallization from ethanol.

*Example 18*

5 parts of 1-amino-4-(9-xanthenyl)piperazine, 5 parts of benzophenone, and 0.5 part of p-toluenesulfonic acid are heated at about 150° C. for 1 hour. The resultant melt is then poured into 2-propanol. The solid which forms is separated. It is 1-diphenylmethyleneamino-4-(9-xanthenyl)piperazine and it melts at about 149–151° C.

If 1-amino-4-(9-xanthenyl)piperazine is reacted with xanthone, thioxanthone, anthrone, or 10,11-dihydro-5H-dibenzo[a,d]cyclohepten-5-one according to the above procedure, the corresponding hydrazone is obtained in each instance.

*Example 19*

The same general procedure described in Example 1 is used in the reaction of pyridinecarboxaldehyde with the appropriate piperazine. The following specific preparations are involved:

Reaction of pyridine-2-carboxaldehyde with 1-amino-4-(9-xanthenyl)piperazine gives 1-(2-pyridylmethyleneamino)-4-(9-xanthenyl)piperazine melting at about 138–142° C. after recrystallization from a mixture of 2-propanol and ethanol.

Reaction of pyridine-3-carboxaldehyde with 1-amino-4-(9-xanthenyl)piperazine gives 1-(3-pyridylmethyleneamino)-4-(9-xanthenyl)piperazine melting at about 162–163° C. after recrystallization from a mixture of 2-propanol and ethanol.

Likewise, reaction of pyridine-4-carboxaldehyde with 1-amino - 4 - (9 - xanthenyl)piperazine gives 1-(4-pyridylmethyleneamino)-4-(9-xanthenyl)piperazine melting at about 225–227° C.

Similarly, the reaction of pyridine-2-carboxaldehyde with 1-amino-4-(9-thioxanthenyl)piperazine gives 1-(2-pyridylmethyleneamino) - 4 - (9-thioxanthenyl)piperazine melting at about 155–156° C. after recrystallization from a mixture of chloroform and hexane.

In a similar manner, 4-acetylpyridine reacts with 1-amino-4-(9-xanthenyl)piperazine to give 1-[α-(4-pyridyl)ethylideneamino] - 4 - (9-xanthenyl)piperazine melting at about 169–171° C.

The reaction of pyridine-4-carboxaldehyde with 1-amino-4-(2-chloro-9-xanthenyl)piperazine gives 1-(4-pyridylmethyleneamino) - 4-(2-chloro-9-xanthenyl)piperazine melting at about 219–220° C. after recrystallization from a mixture of chloroform and ether. This compound has the following formula

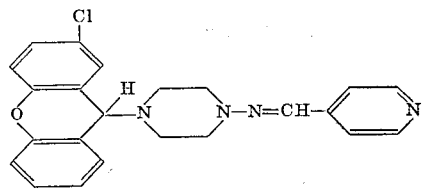

*Example 20*

6-methylpyridine - 2 - carboxaldehyde and quinoline-4-carboxaldehyde react 1-amino-4-(9-xanthenyl)piperazine according to the procedure described in Example 1 to give, respectively, 1-(6-methyl-2-pyridylmethyleneamino)-4-(9-xanthenyl)piperazine and 1-(4-quinolylmethyleneamino)-4-(9-xanthenyl)piperazine.

*Example 21*

2.5 parts of N-methylisatin is reacted with 4 parts of 1-amino-4-(9-xanthenyl)piperazine according to the procedure described in Example 1. The crude product obtained is recrystallized from a mixture of chloroform and hexane to give yellow crystals of 1-(1-methyl-2-oxo-3-indolinylideneamino)-4-(9-xanthenyl)piperazine melting at about 135–140° C. This compound has the following formula

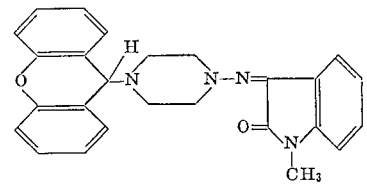

*Example 22*

A solution of 5 parts of 1-amino-4-(9-xanthenyl)piperazine, 2.5 parts of 2,3-dihydro-1H-pyrrolizin-1-one and 3 drops of glacial acetic acid in 55 parts of 2-propanol is heated on a steam bath for 1 hour. The solution is cooled and crystals form. These are separated and recrystallized from a mixture of chloroform and hexane to give 1-(2,3-dihydro-1H-pyrroliz-1-ylideneamino) - 4 - (9-xanthenyl)piperazine melting at about 196–197° C. This compound has the following formula

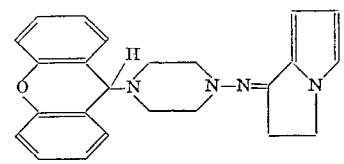

*Example 23*

An equivalent quantity of ferrocenecarboxaldehyde is substituted for the benzaldehyde and the procedure of Example 1 is repeated. The product obtained is 1-ferrocenylmethyleneamino-4-(9-xanthenyl)piperazine melting at about 200–203° C., with decomposition, after recrystallization from a mixture of chloroform and hexane.

*Example 24*

6 parts of glacial acetic acid is added to a mixture of 20 parts of xanthen-9-ol in 175 parts of toluene and heated to reflux. To the resulting solution there is added 27 parts of 1-(fluoren-9-ylideneamino)piperazine and the resultant solution is refluxed for 2 hours in an apparatus equipped with a water trap. The reaction mixture is then cooled and the solvent is evaporated to leave a crystalline residue. This residue is recrystallized from 2-propanol to give 1-(fluoren-9-ylideneamino) - 4 - (9-xanthenyl)piperazine melting at about 187–188° C. Other substituted piperazines of this type are prepared in a similar manner.

The 1-(fluoren-9-ylideneamino)piperazine referred to above is obtained by heating equivalent quantities of 9-fluorenone and 1-aminopiperazine in ethanol solution in the presence of acetic acid and isolating the product from the reaction mixture.

What is claimed is:
1. A compound of the formula

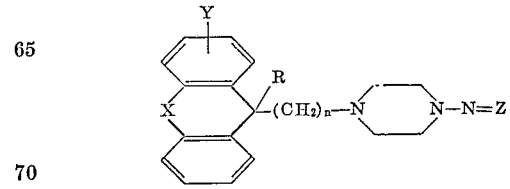

wherein X is an element of group VI of the periodic table of an atomic weight less than 40; Y is selected from the group consisting of hydrogen, methyl, and chlorine; R is selected from the group consisting of hydrogen and lower alkyl; n is a whole number between zero and two inclusive; Z is selected from the group consisting of cycloalkylidene containing from 5 to 12 carbon atoms inclusively, fluoren-9-ylidene, indanylidene, benzocyclohexylidene, dibenzocyclohexylidene, dibenzocycloheptylidene, 9-xanthenylidene, 9-thioxanthenylidene, phenylcyclohexylidene, 1-(lower alkyl)-4-piperidylidene, 1-benzyl-4-piperidylidene, 1-diphenylmethyl-4-piperidylidene, 1-methyl-2-oxo - 3 - indolinylidene, 2,3-dihydro-1H-pyrrolizylidene, and

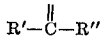

wherein R' is selected from the group consisting of hydrogen, lower alkyl, phenyl, tolyl, halophenyl, methoxyphenyl, dimethoxyphenyl, methylenedioxyphenyl, hydroxypehnyl, dialkylaminoalkoxyphenyl, dimethylaminophenylacetamidophenyl, cyanophenyl, styryl, phenyl(lower alkyl), naphthyl, pyridyl, methylpyridyl, and quinolyl, and R" is selected from the group consisting of hydrogen, lower alkyl, and phenyl.

2. 1-benzylideneamino-4-(9-xanthenyl)piperazine.
3. 1 - benzylideneamino-4-(9-thioxanthenyl)piperazine.
4. 1 - piperonylideneamino-4-(9-xanthenyl)piperazine.
5. 1 - piperonylideneamino-4-(9-thioxanthenyl)piperazine.
6. A compound of the formula

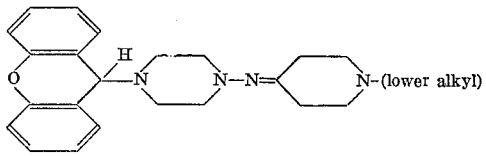

7. 1-(1-methyl-4-piperidylideneamino) - 4 - (9 - xanthenyl)piperazine.
8. A compound of the formula

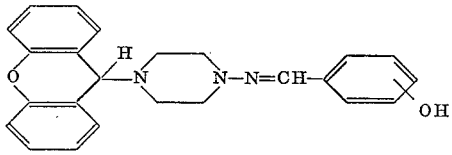

9. 1 - (4 - hydroxybenzylideneamino)-4-(9-xanthenyl)piperazine.

10. A compound of the formula

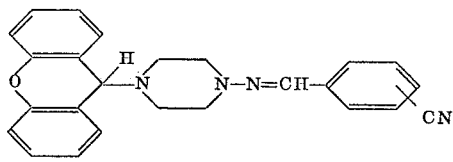

11. 1 - (4 - cyanobenzylideneamino)-4-(9-xanthenyl)piperazine.
12. 1 - (fluoren - 9 - ylideneamino)-4-(9-xanthenyl)piperazine
13. A compound of the formula

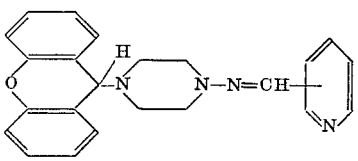

14. 1 - (4 - pyridylmethyleneamino)-4-(9-xanthenyl)piperazine.
15. 1 - (4 - pyridylmethyleneamino)-4-(2-chloro - 9-xanthenyl)piperazine.

References Cited
UNITED STATES PATENTS

| | | | |
|---|---|---|---|
| 3,126,411 | 3/1964 | Rey-Bellet et al. | 260—240 X |
| 3,159,636 | 12/1964 | Yonan et al. | 260—268 |
| 3,178,422 | 4/1965 | Cusic et al. | 260—240 |
| 3,262,934 | 7/1966 | Cusic et al. | 260—268 |
| 3,290,300 | 12/1966 | Cusic et al. | 260—240 |

OTHER REFERENCES

Sadwicki et al.: J. Org. Chem., vol. 21, pp. 183 to 189 (1956).

Winthrop et al.: J. Org. Chem., vol. 27, pp. 230–231 (1962).

Villani et al.: J. Med. and Pharm. Chem., vol. 5, pp. 373–374 (1962).

JOHN D. RANDOLPH, *Primary Examiner.*

UNITED STATES PATENT OFFICE
CERTIFICATE OF CORRECTION

Patent No. 3,374,231                                                March 19, 1968

John W. Cusic et al.

It is certified that error appears in the above identified patent and that said Letters Patent are hereby corrected as shown below:

Column 1, line 51, "-9-xylidene" should read -- -9-ylidene --. Column 2, line 31, "-9-xylidene" should read -- -9-ylidene --. Column 6, line 32, "-(9-zanthenyl)" should read -- -(9-xanthenyl) --.

Signed and sealed this 2nd day of December 1969.

(SEAL)

Attest:

Edward M. Fletcher, Jr.                                WILLIAM E. SCHUYLER, JR.
Attesting Officer                                               Commissioner of Patents